No. 620,856. Patented Mar. 7, 1899.
P. SICOTTE.
BAND SAW SETTING MACHINE.
(Application filed May 10, 1898.)
(No Model.) 2 Sheets—Sheet 1.
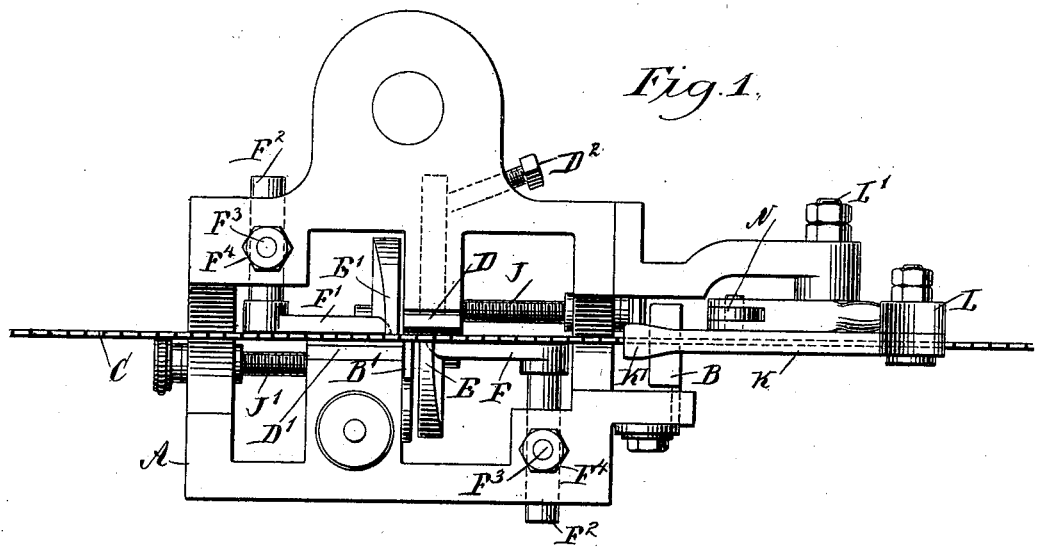
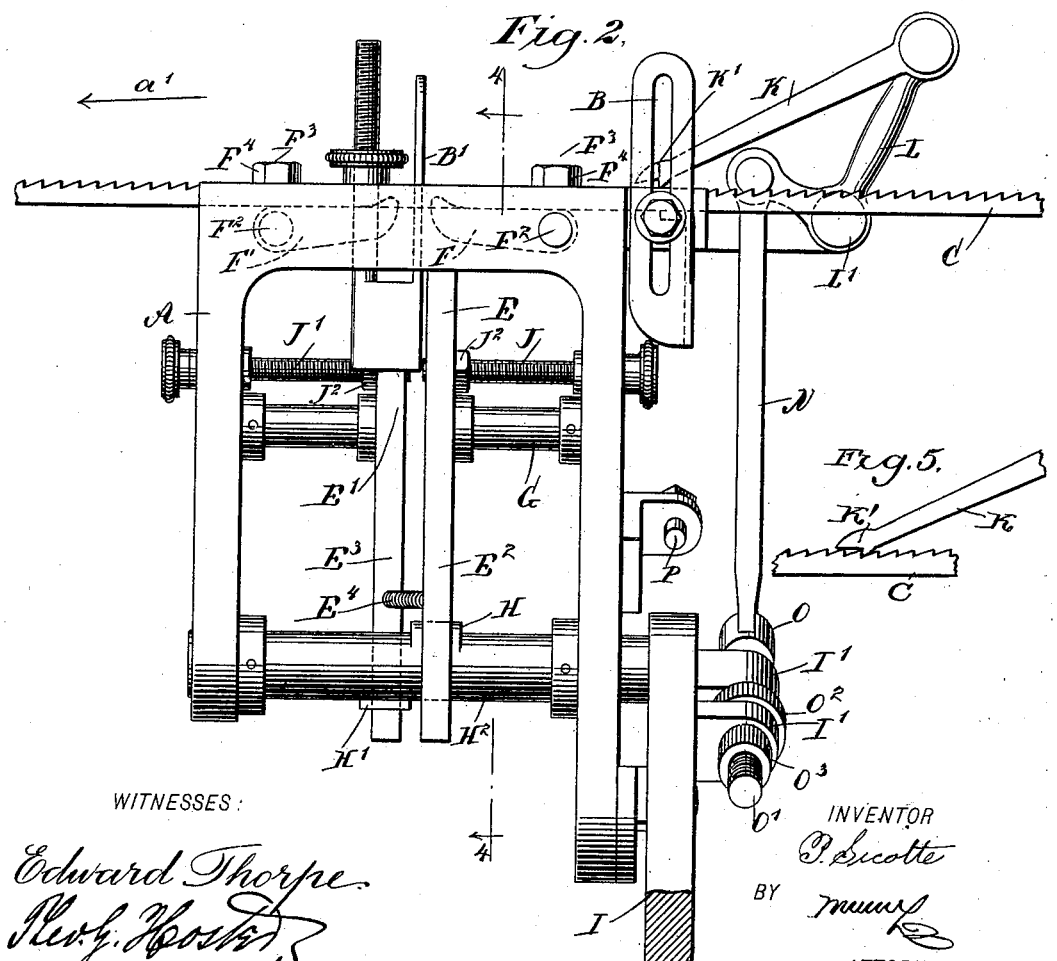
WITNESSES:
Edward Thorpe
Rev. J. Hosti
INVENTOR
P. Sicotte
BY
ATTORNEYS.

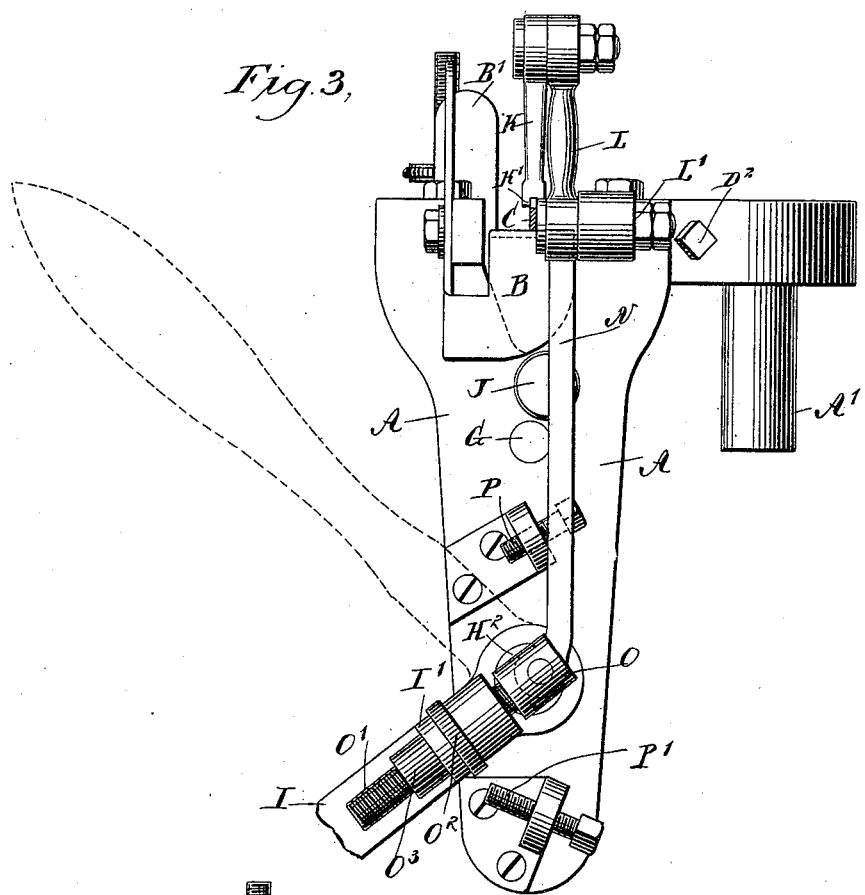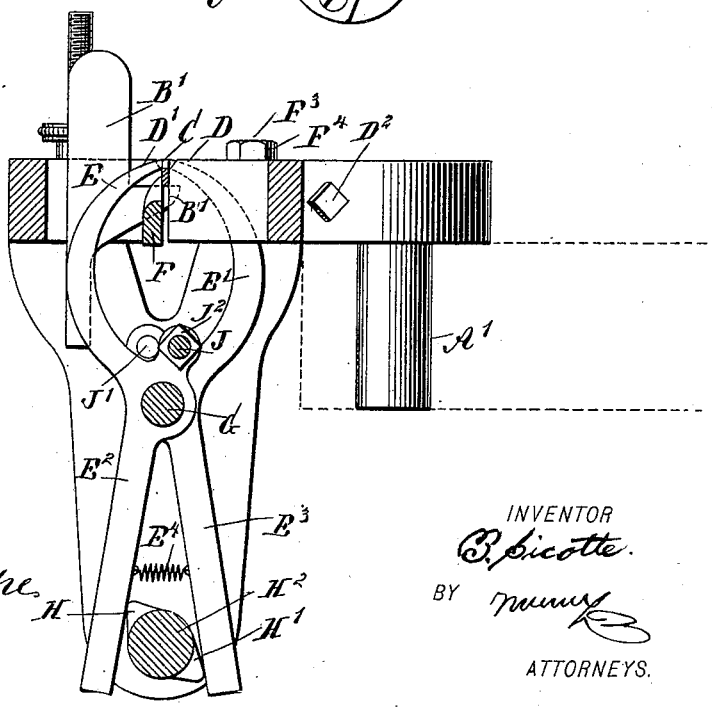

UNITED STATES PATENT OFFICE.

PIERRE SICOTTE, OF LANSING, KANSAS, ASSIGNOR TO HIMSELF, AND HENRY J. HELLMERS, JR., OF LEAVENWORTH, KANSAS.

BAND-SAW-SETTING MACHINE.

SPECIFICATION forming part of Letters Patent No. 620,856, dated March 7, 1899.

Application filed May 10, 1898. Serial No. 680,304. (No model.)

*To all whom it may concern:*

Be it known that I, PIERRE SICOTTE, of Lansing, in the county of Leavenworth and State of Kansas, have invented a new and Improved Band-Saw-Setting Machine, of which the following is a full, clear, and exact description.

The object of the invention is to provide a new and improved band-saw-setting machine which is simple and durable in construction and arranged to properly feed the saw forward and bring the teeth accurately in position for the setting-tools to act on the teeth and set the same simultaneously, the saw-blade being prevented from springing during the setting operation.

The invention consists of novel features and parts and combinations of the same, as will be hereinafter fully described, and pointed out in the claims.

Reference is to be had to the accompanying drawings, forming a part of this specification, in which similar characters of reference indicate corresponding parts in all the figures.

Figure 1 is a plan view of the improvement. Fig. 2 is a side elevation of the same. Fig. 3 is an end elevation of the same. Fig. 4 is a transverse section of the same on the line 4 4 of Fig. 2, and Fig. 5 is a detail showing a saw-moving pawl employed.

The improved saw-setting machine is provided with a suitably-constructed frame A, adapted to be fastened by a pin A' or other means to a bench or other support. On the frame A and held vertically adjustable are the alined saw-rests B B' for a band-saw C, of which the saw-rest B' is adjacent to the anvils D D', secured to the saw-frame and arranged one alongside the other to face the saw-blade on opposite sides, as will be readily understood by reference to Fig. 1. One of the anvils, preferably the anvil D, is made laterally adjustable on the saw-frame by a set-screw $D^2$ to permit of setting the anvils for saws of different thicknesses and without leaving a space between the saw and the anvils.

Each of the anvils D D' is formed at its upper end with a bevel, against which the corresponding saw-tooth is set by the setting-tools E E', arranged to move transversely relatively to the saw C and the corresponding anvils D D'.

In order to hold the saw-blade in position and prevent the same from springing during the setting operation, I provide guide-fingers F F', (see Figs. 1 and 4 and dotted lines in Fig. 2,) arranged with their free ends opposite the anvils D D', respectively, to engage that portion of the saw-blade directly under the tooth to be set at the time. Each of the guide-fingers F F' is provided with a shank $F^2$, engaging the eye of an eyebolt $F^3$, extending vertically in the frame A and engaged at its upper end by a nut $F^4$, screwing against the top of the frame, so that when the nut is screwed up and the eyebolt $F^3$ is drawn in a vertical direction then the shank $F^2$ is securely clamped in place in its bearing in the frame A. When the nut $F^4$ is loosened, the shank $F^2$ can be readily turned in its bearing in the frame A to bring its free end in proper position relatively to the saw-blade, as before described.

The setting-tools E E' are in the shape of arms, as indicated in Fig. 4, and are fitted to slide longitudinally on pins G, secured in the lower portion of the frame A. The said setting tools E E' are provided at their lower ends with extension-arms $E^2 E^3$, respectively, adapted to be engaged by cams H H', respectively, projecting in diametrical directions from the peripheral surface of a shaft $H^2$, journaled in suitable bearings in the frame A and provided at one end with a handle under the control of the operator. A spring $E^4$ may be employed to connect the extension-arms $E^2 E^3$ with each other so as to hold said arms in contact with the shaft $H^2$ and its cams H H', the weight of the arms being, however, sufficient to hold the arms in the position referred to.

Normally the setting-tools E E' are out of engagement with the saw C; but when the arm I, hereinafter more fully described, is swung into a lowermost position then the cams H H' act on the arms $E^2 E^3$ to impart a swinging motion thereto and move the tools E E' in engagement with the corresponding teeth of the saw C to set the teeth in opposite directions against the bevels of the anvils D D'. Thus by the arrangement described two teeth of the saw are set simultaneously in opposite directions and without danger of springing the saw-blade, owing to the secure position of the blade against the faces of the anvils and the fingers F F'.

In order to set the tools E E' longitudinally according to the distance between the adjacent saw-teeth, I provide screw-rods J J', mounted to turn in arc-slots formed in the sides of the frame A and screwing in the said tools, so that upon turning the screw-rods the tools are shifted in a longitudinal direction on the pins G. The rods J J' are provided with jam-nuts $J^2$ for engaging the tools to lock the rods against turning and prevent any displacement of the tools after they are set to the proper position according to the work in hand.

The saw-feeding device is actuated from an arm I, and the saw is fed forward in the direction of the arrow $a'$, at the time the arm I is swung into an uppermost position and at the time the tools E E' are in their normal or disengaged position relatively to the saw. The feeding device is provided with a feeding-pawl K, having a shoulder K' at its free end to engage a corresponding tooth. The pawl K is fulcrumed on one arm of a bell-crank lever L, fulcrumed at L' on the frame A and pivotally connected at its other arm by a link N with the head O of a screw-rod O', fitted to slide laterally in suitable bearings I', attached to the arm I. A nut $O^2$ screws on said screw-rod between said bearings, so that upon turning the nut the screw-rod O' is shifted laterally to bring the head closer to or farther from the center of the shaft $H^2$ to give more or less throw to said head O upon manipulating the arm I, thus increasing or decreasing the throw of the pawl K. A jam-nut $O^3$, screwing on the rod O', serves to lock the latter in place after the desired adjustment is made. The arm I has a limited swinging motion between two set-screws P P', carried by the frame A. Now it is evident that by the arrangement described any desired throw can be given to the pawl K, according to the size of the teeth of the saw under treatment, without, however, changing the opening and closing device for the setting-tools, which are operated from the same arm that works the feed.

In hand-filed saws the depressions between the teeth are invariably of unequal depth, but the points of the teeth are in a straight line. The pawl K used to move the saw forward, if consisting at its contact with the saw of a point to drop into the notches between the teeth, will move the saw unequal distances in proportion to the varying depths of the notches, resulting in an inaccurate presentation of the teeth to the setting-tools. To prevent this, I provide the pawl with a forward projection, which will engage with the points of the teeth, insuring the engagement of its shoulder with all the teeth at the same distance from the points.

Having thus fully described my invention, I claim as new and desire to secure by Letters Patent—

1. A band-saw-setting machine, provided with anvils arranged one alongside the other but facing the saw-blade from opposite sides, setting-tools for setting the teeth on said anvils, adjustable guide-fingers for holding the saw-blade on the face of the anvils, to prevent springing of the saw-blade during the setting of the teeth, rotative shanks on which the fingers are mounted, and clamping-screws for the shanks, substantially as shown and described.

2. A band-saw-setting machine, provided with anvils facing opposite sides of the saw-blade, and each formed with a bevel for a tooth to be set against, guide-fingers for holding the saw on the anvils, rotative shanks on which the fingers are mounted, means for clamping the shanks, tooth-setting tools for setting adjacent teeth in opposite directions against said bevels, said tools being mounted to swing transversely relatively to the saw and anvils, and cams for imparting a swinging motion to said tools to press or set the teeth, substantially as shown and described.

3. A band-saw-setting machine, provided with a feeding device comprising a pawl for engaging the band-saw teeth, a projection on the pawl to engage upon the points of the teeth, a bell-crank lever for operating the pawl, an arm mounted to swing, a link connecting the arm with the bell-crank lever, and an adjusting device carried on the arm and connected with the link, substantially as shown and described.

4. In a saw-setting machine, a feeding device for the saw, comprising an arm mounted to swing, bearings on said arm, a screw mounted to slide in said bearings, a nut on the screw, and between the bearings, a pawl for engaging with the saw, an angle-lever on which the pawl is mounted, and a link connection between the lever and one end of the screw, substantially as specified.

5. In a saw-setting machine, a feeding device for the saw, comprising a pawl for engaging the saw-teeth, the said pawl having a projection for engaging upon the points of the teeth, and mechanism for operating said pawl, substantially as specified.

6. A band-saw-setting machine, provided with anvils arranged to face a saw at opposite sides, setting-tools for setting the saw-teeth on the anvils, pins on which the setting-tools are mounted to slide and also to swing, screws connecting with the tools and adapted to adjust them longitudinally of the pins, a rock-shaft, and cams on said rock-shaft for swinging the tools, substantially as specified.

PIERRE SICOTTE.

Witnesses:
DAN STORRS,
W. A. MORGAN.